April 15, 1969      D. L. SELHOST      3,438,181

FILTER MEDIA SUPPORT ARRANGEMENT

Filed Sept. 25, 1967      Sheet 1 of 2

INVENTOR.
DALE L. SELHOST
BY
ATTORNEY

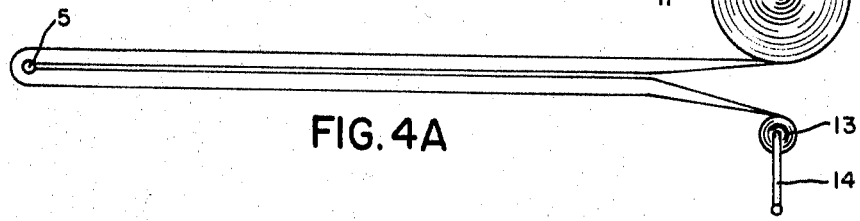
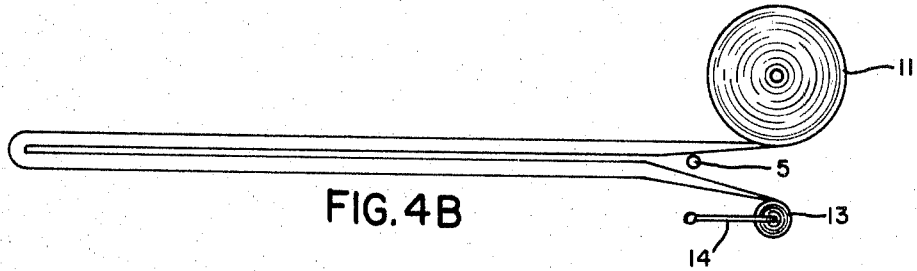
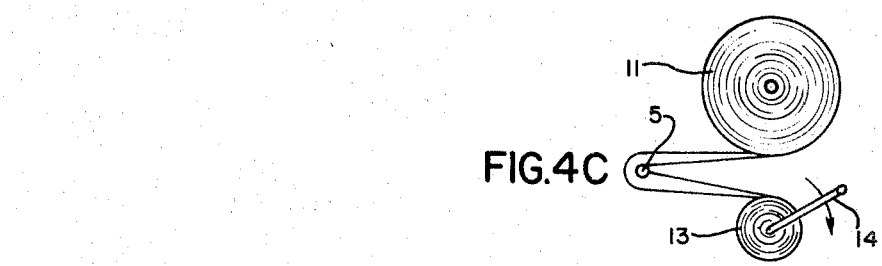
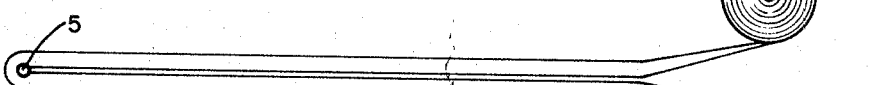
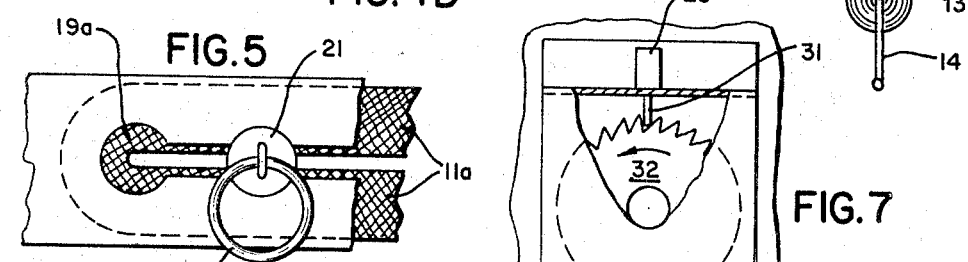
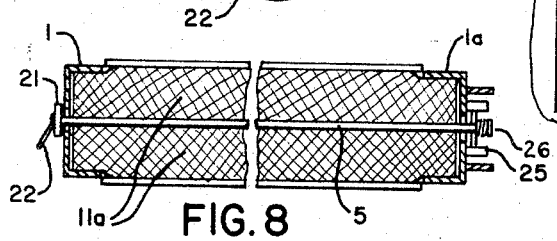
INVENTOR.
DALE L. SELHOST
BY
ATTORNEY

United States Patent Office 3,438,181
Patented Apr. 15, 1969

3,438,181
FILTER MEDIA SUPPORT ARRANGEMENT
Dale L. Selhost, Rock Island, Ill., assignor to American Air Filter Company, Inc., Louisville, Ky., a corporation of Delaware
Filed Sept. 25, 1967, Ser. No. 670,179
Int. Cl. B01d 45/18
U.S. Cl. 55—354
9 Claims

ABSTRACT OF THE DISCLOSURE

An apparatus to support a curtain of air filter media within an air flow conduit in air filtering relation and selectively supply new media to the air filtering zone. The apparatus includes a filter media supply means and an exhausted media take-up means both disposed on one side of the air flow conduit, means to supply new media to the filtering zone, and means to withdraw spent filter media from the air filter zone.

Background of the invention

Various types of air filter apparatus provide a curtain of filter media suspended across a gas carrying conduit so the gas passes therethrough and particulate matter carried by the gas stream is deposited on the filter media. In most previous apparatus of this type, the filter media supply means, for example a roll of filter media, is located on one side of the gas flow conduit and the filter media take-up means, for example a take-up roll, is located on an opposite side of the conduit so the filter media passes from the supply means through the gas stream to the take-up means. In such apparatus separate chambers must be provided on opposite sides of the gas flow conduit to accommodate the filter media supply means and the filter media take-up means respectively. In applications where space is at a premium, for example in air conditioning apparatus, the provision of a chamber on either side of the gas flow conduit undesirably increases the size and expense of the apparatus.

Likewise, in previous apparatus where filter media supply is provided on one side of the gas flow conduit and filter media take-up means are provided on an opposite side of the gas flow conduit, it is difficult to load the filter media into the apparatus unless a conveyor is provided to carry the media across the conduit because the leading edge of a new supply of media must be threaded through the air filter zone and wound on the filter media take-up means. A conveyor mechanism is prohibitively expensive for many applications, for example in room air-conditioning units, and loading the filter media into such apparatus is a complicated manual operation requiring a significant amount of time and often results in the destruction of a considerable quantity of filter material.

In other air filtering apparatus, individual removable air filter units are provided which are periodically replaced with new filter units. In such arrangements, particularly when used with an air-conditioning device, the filter unit removed from the air conditioner is full of dirt and removing the exhausted units in the area served by the air conditioning device is undesirable, because of the probability that dirt wil be dislodged from the filter unit when it is removed from the air conditioner.

Summary of the invention

The present invention provides an apparatus for disposing a length of air filter media in air filtering position within an air carrying conduit and a straightforward method for renewing the filter media which eliminates many of the disadvantages of previous apparatus.

One object of the present invention is to provide a filter media loading arrangement where both the filter media supply means and the filter media take-up means are disposed on the same side of the air flow conduit so the amount of space required for the filtering arrangement is greatly reduced and the size of the apparatus can be reduced accordingly.

Furthermore, the present invention provides an air filtering arrangement which includes means to thread the filter media from the filter supply means to the filter media take-up means before it is introduced to the air filtering zone so it is not necessary to thread the leading edge of the filter media across the air filtering zone manually or provide a conveyor means across the air filtering zone.

Moreover, the present invention provides an air filter media support arrangement where the exhausted media is expeditiously removed from the air filtering zone to an exhausted filter media take-up means, which, in turn, is easily removed from the apparatus as a compact package and the dirt contained within the package is not likely to be dislodged when the roll is removed from the unit.

Various other features of the present invention will become obvious to those skilled in the art upon reading the disclosure set forth hereinafter.

More particularly, the present invention provides an air filter arrangement for an air filtering zone within an air carrying conduit comprising: channel means disposed in spaced, generally parallel relationship along opposite sides of the air flow conduit in a position generally transverse the direction of air flow through the conduit to define opposite edges of the air filtering zone; filter media supply means disposed adjacent a first open end of the channels to supply filter media to be advanced longitudinally into the channel means; filter media take-up means disposed adjacent the first open end of the channels in spaced relation from the filter media supply means to receive filter media removed from the channel means; and, carriage means having media guide means disposed to engage the surface of filter media, which extends from the media supply means to the media take-up means, at a point between the media supply means and the media take-up means and travel longitudinally along the channel means to urge the media longitudinally through the channel means.

Referring now to the figures.

Figure 1:
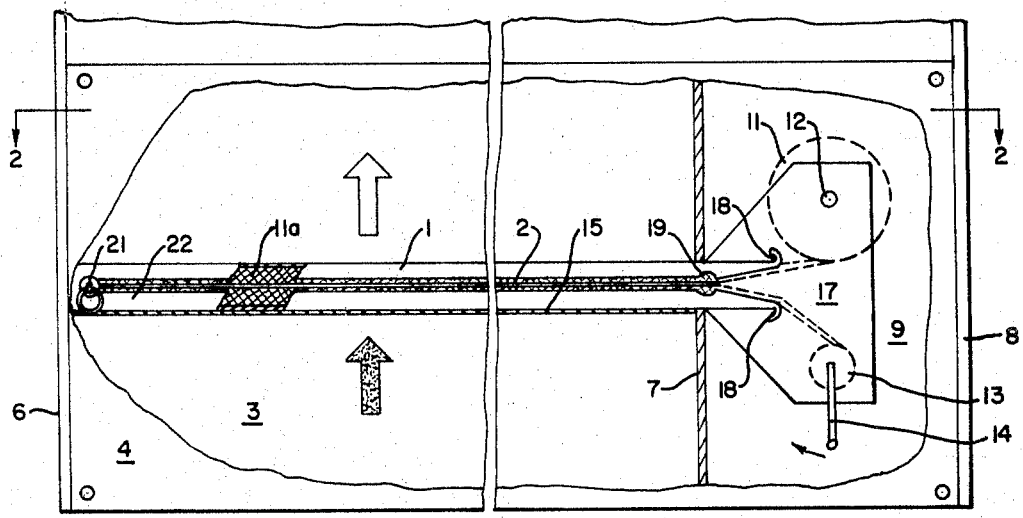
FIGURE 1 is an elevational view, in section, of one exampel of apparatus in accordance with the present invention.
Figure 2:
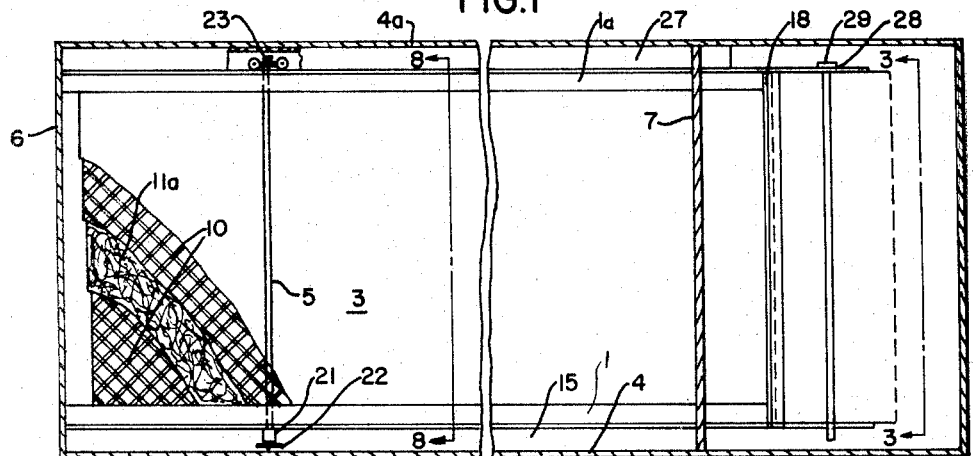
FIGURE 2 is a view taken along a plane passing through line 2—2 of FIGURE 1.
Figures 3, 6:
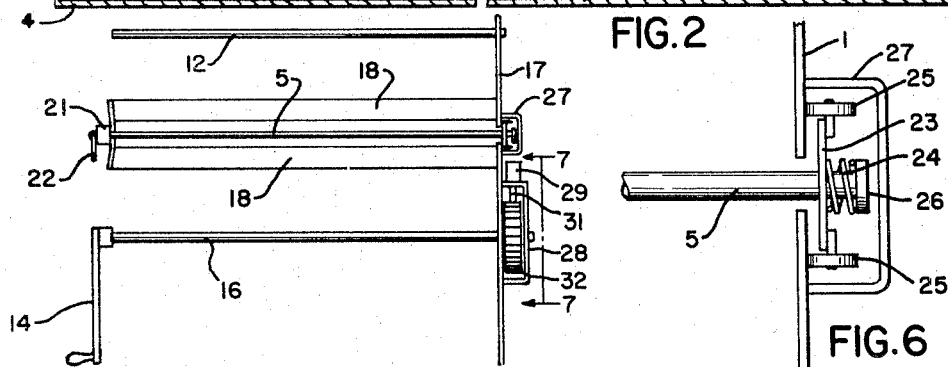
FIGURE 3 is an end view showing the filter media supply section of FIGURE 1.

FIGURES 4A–D are sequential schematic illustrations of the method of operation of an apparatus in accordance with the present invention;

FIGURE 5 is an enlarged, fragmentary, sectional view of one end of the channel means of the example of FIGURE 1;

FIGURE 6 is an enlarged, transverse view of a portion of the carriage means shown in FIGURE 3;

FIGURE 7 is an enlarged view, partly in section, taken along a plane passing through line 7—7 of FIGURE 3; and, FIGURE 8 is a view taken along a plane passing through line 8—8 of FIGURE 2.

The figures show one example of an air filter arrangement in accordance with the present invention which includes an air flow conduit 3 where channel members 1 and 1a are disposed in parallel relationship along opposite side walls 4 and 4a which define opposite sides of conduit 3. Channels 1 and 1a are adapted to receive a length of air filter media 11a so the air stream flowing through conduit 3, as indicated by the arrows of FIGURE 1, passes through the filter media to remove particulate matter carried by the air stream. A filter media supply roll 11 is disposed to feed new filter media to the air filter zone defined by conduit 3 and filter media take-up rolls 13 is provided to receive spent filter media withdrawn from the filter zone.

The filter apparatus can be provided, for example, in an air conditioning apparatus where flow conduit 3 carries conditioned air to be supplied to a space served by the air conditioning device and is defined between end wall 6, center wall 7, and side walls 4 and 4a. It will be noted that a second chamber 9 is defined between center wall 7, end wall 8, and side walls 4 and 4a. Spindle means, hereinafter described, are provided in chamber 9 to mount a filter media supply roll 11 and a filter media rewind roll 13.

As shown in FIGURE 2, channels 1 and 1a, which are disposed on opposite walls 4 and 4a of conduit 3, extend transverse the direction of air flow through conduit 3 and are adapted to receive a double thickness of filter media 11a from roll 11. Each channel includes a longitudinally extending slot 2 in mutually aligned relation. One end of each of the channels 1 and 1a extends into chamber 9 to provide open ends in the chamber. Curved guide means 18 are provided to extend across conduit 3 from one channel to the other adjacent the open ends of the channels to form a smooth entrance to the channels to facilitate loading the filter media into, and removing the media from, the filter zone defined between the channels. A web 17 is disposed adjacent channel 1a to support a first spindle 12 adapted to receive roll 11 of filter media and a second spindle 16 adapted to receive filter media take-up roll 13. A crank means 14 is removably mounted on spindle 16 so spindle 16 and roll 13 can, advantageously, be rotated to take up exhausted filter media as hereinafter described.

A carriage means 23, hereinafter described, is provided to travel the length of channels 1 and 1a through slots 2 and, as shown in the figures, carries guide means, for example a rod 5, extending substantially the width of conduit 3 between the respective channels 1 and 1a to guide the filter media into channels 1 and 1a and through the filtering zone defined by the channels. Rod 5 is advantageously sized to be received by slots 2 of the channels and rod 5 can be pulled through the filtering zone manually.

In the example as shown in the figures a ring pull 22 is attached to rod 5 by means of a hub 21 which can be of larger diameter than slot 2 of channel 1. Apertures 19 and 19a having a diameter larger than the diameter of hub 21 can be provided in channel 1 to receive hub 21 and selectively prevent movement of rod 5 through slot 2. To release rod 5 for movement through channels 1, ring 22 is pulled to withdraw hub 21 from aperture 19 and rod 5 is then free to be moved longitudinally through slots 2 of channel 1. Apertures 19 can advantageously be spaced along channels 1 as desired by the mode of operation adopted for the particular apparatus, one example of which is hereinafter described.

Referring now to FIGURE 6, rod 5 is also attached to a carriage 23 which is mounted on wheels 25 and adapted for movement through a channel 27 in response to the movement of rod 5 along channel 27. Channel 27 is attached to channel 1a, for example by welding, and is cooperatively adapted to receive carriage 23 so rod 5 extends through slots 2 of channels 1 and 1a. Rod 5 extends through an aperture (not shown) in carriage 23 and a stop 26 is provided at the end of rod 5 to retain a compression spring 24. Spring 24 is provided between stop 26 and carriage 23 to advantageously urge stop 26 away from carriage 23 so hub 21 is drawn into locking engagement with apertures 19 and 19a of channel 1.

As shown in FIGURE 7, a ratchet mechanism is provided at the end of spindle 16 to permit the spindle to turn in only one direction. It will be recognized that in the example of the present invention, shown in the figures, the spindle can advantageously rotate in one direction or the other but not both. To restrict rotation of spindle 16 to the desired direction, a gear wheel 32 having inclined teeth is provided. A spring loaded pin 31 is received by a chamber 29 to be urged to seating relation between the teeth of the gear wheel to permit rotation in the direction shown by the arrow but prevent rotation in the other direction.

In some applications, as shown in the figures, it is necessary to provide space between channel 1 and the removable wall member 4 for longitudinal movement of hub 21 along channel 1. In such applications a sealing edge 15, as shown, can be provided to extend from channel 1 to wall member 4 to prevent flow of air between channel 1 and wall 4. Sealing edge 15 can, advantageously, be attached to wall 4 to be urged against channel 1 when wall 4 is placed in locked position and removed with the wall member.

As shown in FIGURES 2 and 8, open work support grids 10 can be provided on opposite sides of channel 1 to extend across conduit 3 and for a substantial portion of the length of the channels between outer wall 6 and center wall 7 to support media 11a in air filtering position.

To load a new roll of filter media into the apparatus, a full spool of material 11 is placed on spindle 12 and an empty spool 13 is placed on spindle 16. Rod 5 is drawn to chamber 9 adjacent the open end of channels 1 and 1a so that hub 21 is received by aperture 19 of channel 1. Filter media from the new roll of media is threaded around rod 5 and attached to spool 13. Hub 21 is then withdrawn from aperture 19 and rod 5 is drawn along channels 1 and 1a through the air filtering zone to the end of channels 1 and 1a adjacent wall 6. Roll 11 turns freely on spindle 12 so filter media is withdrawn from roll 11 as rod 5 is drawn the length of channels 1 and 1a, while roll 13 does not rotate because of the ratchet mechanism hereinbefore described, so new media is withdrawn from the supply roll 11. Aperture 19a is located to receive hub 21 when rod 5 has been drawn substantially the length of conduit 3 so a double thickness of filter media is distributed the length of the filtering zone defined by channels 1 and 1a in conduit 3.

The method to change the media and remove exhausted media from the air filtering zone is as shown schematically in FIGURE 4A–D. FIGURE 4A shows the media in normal filtering relation. To change the media hub 21 is removed from locking engagement with aperture 19a so rod 5 is withdrawn to the side of the conduit 3 adjacent the supply and take-up rolls, as shown in FIGURE 4B. Crank 14 is attached to spindle 16 and is rotated in the one direction in which it will turn to withdraw exhausted media from channels 1 and wind the media onto take-up roll 13. When the media has been completely withdrawn from the filtering zone, it contacts rod 5 and passes from the supply roll around rod 5 to take-up roll 13 as shown in FIGURE 4C.

To reload the filter zone with media as shown in FIGURE 4D, rod 5 is moved to the side of channels 1 and 1a opposite the supply roll and take-up roll to withdraw new filter media from supply roll 11 and distribute the media across the filtering zone.

When the entire spool of new filter media has been exhausted, the take-up roll 13 is removed from spindle 16 as a compact package and discarded, and a new roll of media is loaded onto spindle 12.

It likewise will be noted that by proper spacing of aperture 19, it is possible to renew any selected portion of the filter media. For example, if it is desired to renew only half of the media at one time, aperture 19 can be placed in the center of the length of channels 1 so that a portion of the used media remains in the filter unit and only half is renewed.

The invention claimed is:

1. An air filter support arrangement to supply filter media to an air filtering zone within an air carrying conduit comprising: media receiving channel means disposed in spaced, generally parallel, relationship along opposite sides of and across said air flow conduit generally transverse to the direction of air flow through said conduit; filter media supply means disposed adjacent a media inlet and outlet opening defined by an open end of said channel means supplying a web of filter media through said open end of said channel means and longitudinally along the length of said channel means, the opposite edges of said web being retained by the respective channel means on opposite sides of said air flow conduit holding said web in air filtering relation across said conduit; filter media takeup means disposed adjacent said media inlet and outlet opening at the same end of said channel means as, and in spaced relation from said filter media supply means to receive filter media removed from said channel means; media carriage means extending across the conduit and between the channel means including guide means disposed to engage the web of filter media extending from said supply means to said takeup means at a point between said media supply means and said media takeup means, said guide means being disposed to be moved longitudinally between the channel means across the conduit and to be retracted to a point adjacent the open end of the channel means by said carriage means to draw said web of filter media through said open end of said channel means and to enable the take up means to remove the filter media from the flow conduit and to dispose said media in said air filter zone; and, means to guide said carriage means longitudinally along said channel means to air filtering position in said filtering zone.

2. The apparatus of claim 1 wherein said filter media supply means includes a roll of filter media disposed to provide filter media to said open end of said channel means and said filter media take-up means includes roll means disposed to receive filter media from said open end of said channel means.

3. The apparatus of claim 2 wherein said filter media take-up roll is mounted on a spindle means including ratchet means to permit rotation of said filter media take-up roll in only one direction.

4. The apparatus of claim 1 wherein said guide means includes elongate rod means extending substantially the width of said filtering zone between said channel means and said rod means is disposed to engage filter media along a line between said filter media supply means and said filter media take-up means and to be received through said open end of said channel means to travel substantially the length of the channel means through said air filtering zone.

5. The apparatus of claim 4 wherein said opposite channel means have longitudinally extending slots to receive said elongate rod means in sliding relation to guide said rod means through said air filtering zone.

6. The apparatus of claim 5 wherein said carriage means includes wheel means and is adapted to receive said elongate rod means; and track means disposed along one said channel means to receive said carriage and guide said rod means longitudinally along said channel means through said air filtering zone.

7. The apparatus of claim 5 wherein one of said channel means has cooperative apertures disposed in spaced relation longitudinally along said channel means and said rod means includes detent means cooperatively sized to be received by said apertures in said channel means to prevent longitudinal movement of said rod means along said channel means.

8. The apparatus of claim 7 including spring means to urge said detent means to locking relation with said apertures.

9. The apparatus of claim 1 wherein the air filter support arrangement is located in an air conditioning apparatus.

References Cited

UNITED STATES PATENTS

| | | | |
|---|---|---|---|
| 2,133,931 | 10/1938 | Walker et al. | 55—354 |
| 2,463,723 | 3/1949 | Spraragen | 55—354 |
| 2,782,612 | 2/1957 | Spiegelhalter | 55—354 |
| 3,019,855 | 2/1962 | Engle | 55—352 |
| 3,045,410 | 7/1962 | Floyd | 210—401 |
| 3,090,425 | 5/1963 | Carlo | 160—120 |
| 3,128,688 | 4/1964 | Coda | 160—85 |
| 3,368,333 | 2/1968 | Merklin | 55—354 |

FOREIGN PATENTS 985,432  3/1951  France.

HARRY B. THORNTON, *Primary Examiner.*

BERNARD NOZICK, *Assistant Examiner.*